(12) United States Patent
Schneider et al.

(10) Patent No.: US 10,543,834 B2
(45) Date of Patent: Jan. 28, 2020

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Michael Schneider, Stammham (DE); Henrik Kaartometsä, Gaimersheim (DE); Bernhard Brückl, Gerolsbach (DE)

(73) Assignee: AUDI AG, Ingolstadt (DE)

( * ) Notice: Subject to any disclaimer, the term of this patent is extended or adjusted under 35 U.S.C. 154(b) by 187 days.

(21) Appl. No.: 15/843,030

(22) Filed: Dec. 15, 2017

(65) Prior Publication Data

US 2018/0208181 A1 Jul. 26, 2018

(30) Foreign Application Priority Data

Jan. 23, 2017 (DE) .................. 10 2017 200 981

(51) Int. Cl.
*B60W 30/186* (2012.01)
*B60W 20/40* (2016.01)
(Continued)

(52) U.S. Cl.
CPC ............. *B60W 20/40* (2013.01); *B60K 6/387* (2013.01); *B60W 10/02* (2013.01); *B60W 10/06* (2013.01); *B60W 10/08* (2013.01); *B60W 30/186* (2013.01); *F02N 5/04* (2013.01); *F02N 19/00* (2013.01); *F16D 48/06* (2013.01); *B60K 2006/268* (2013.01);
(Continued)

(58) Field of Classification Search
None
See application file for complete search history.

(56) References Cited

U.S. PATENT DOCUMENTS 7,617,808 B2    11/2009  Aswani et al.
9,221,464 B2 *  12/2015  Goh ...................... B60W 10/04
(Continued)

FOREIGN PATENT DOCUMENTS

DE      2752711 A1    11/1978
DE      60206200 T2    6/2006
(Continued)

OTHER PUBLICATIONS

European Search Report dated Sep. 12, 2018, in connection with corresponding EP Application No. 17202073.7 (6 pgs.).
(Continued)

*Primary Examiner* — Justin Holmes
(74) *Attorney, Agent, or Firm* — Maier & Maier, PLLC

(57) ABSTRACT

A method for operating a drive device for a motor vehicle, which has an internal combustion engine and an electric motor. A drive shaft of the internal combustion engine can be coupled to a motor shaft of the electric motor by a shift clutch. The shift clutch is adjusted to a desired clutch torque over a dragging period for startup of the internal combustion engine. Prior to the startup, a quantity of heat that is expected to accrue in the shift clutch during the startup is predicted and, when the predicted quantity of heat exceeds a limit value, at least one operating parameter of the drive device that influences the startup is chosen in such a way that the quantity of heat expected to accrue is reduced.

9 Claims, 1 Drawing Sheet

(51) Int. Cl.
*F02N 19/00* (2010.01)
*B60K 6/387* (2007.10)
*F16D 48/06* (2006.01)
*F02N 5/04* (2006.01)
*B60W 10/02* (2006.01)
*B60W 10/06* (2006.01)
*B60W 10/08* (2006.01)
*B60K 6/26* (2007.10)
*B60K 6/48* (2007.10)

(52) U.S. Cl.
CPC ........... *B60K 2006/4825* (2013.01); *B60W 2510/0275* (2013.01); *B60W 2510/0291* (2013.01); *B60W 2510/0638* (2013.01); *B60W 2510/0685* (2013.01); *B60W 2510/081* (2013.01); *B60W 2710/023* (2013.01); *B60W 2710/025* (2013.01); *B60W 2710/027* (2013.01); *B60W 2710/029* (2013.01); *B60W 2710/0644* (2013.01); *B60W 2710/0661* (2013.01); *B60W 2710/081* (2013.01); *B60Y 2200/92* (2013.01); *B60Y 2300/48* (2013.01); *F16D 2500/1066* (2013.01); *F16D 2500/10412* (2013.01); *F16D 2500/3027* (2013.01); *F16D 2500/30406* (2013.01); *F16D 2500/30415* (2013.01); *F16D 2500/30421* (2013.01); *F16D 2500/30426* (2013.01); *F16D 2500/3166* (2013.01); *F16D 2500/3168* (2013.01); *F16D 2500/5106* (2013.01); *F16D 2500/70426* (2013.01); *Y02T 10/6252* (2013.01); *Y02T 10/6286* (2013.01); *Y10S 903/93* (2013.01); *Y10S 903/946* (2013.01)

(56) References Cited

U.S. PATENT DOCUMENTS

| | | | |
|---|---|---|---|
| 2003/0064858 A1* | 4/2003 | Saeki | B60K 6/44 477/166 |
| 2003/0150685 A1* | 8/2003 | Iida | B60W 10/119 192/82 T |
| 2004/0112171 A1 | 6/2004 | Kuhstrebe et al. | |
| 2006/0009325 A1 | 1/2006 | Ohtake et al. | |
| 2014/0129066 A1* | 5/2014 | Inoue | B60W 20/40 701/22 |
| 2014/0222270 A1 | 8/2014 | Tsutsumi et al. | |

FOREIGN PATENT DOCUMENTS

| | | |
|---|---|---|
| DE | 202014002546 U1 | 6/2015 |
| DE | 102015122280 A1 | 8/2016 |

OTHER PUBLICATIONS

German Search Report dated Jun. 30, 2017 of corresponding German application No. 102017200981.0; 5 pgs.

* cited by examiner

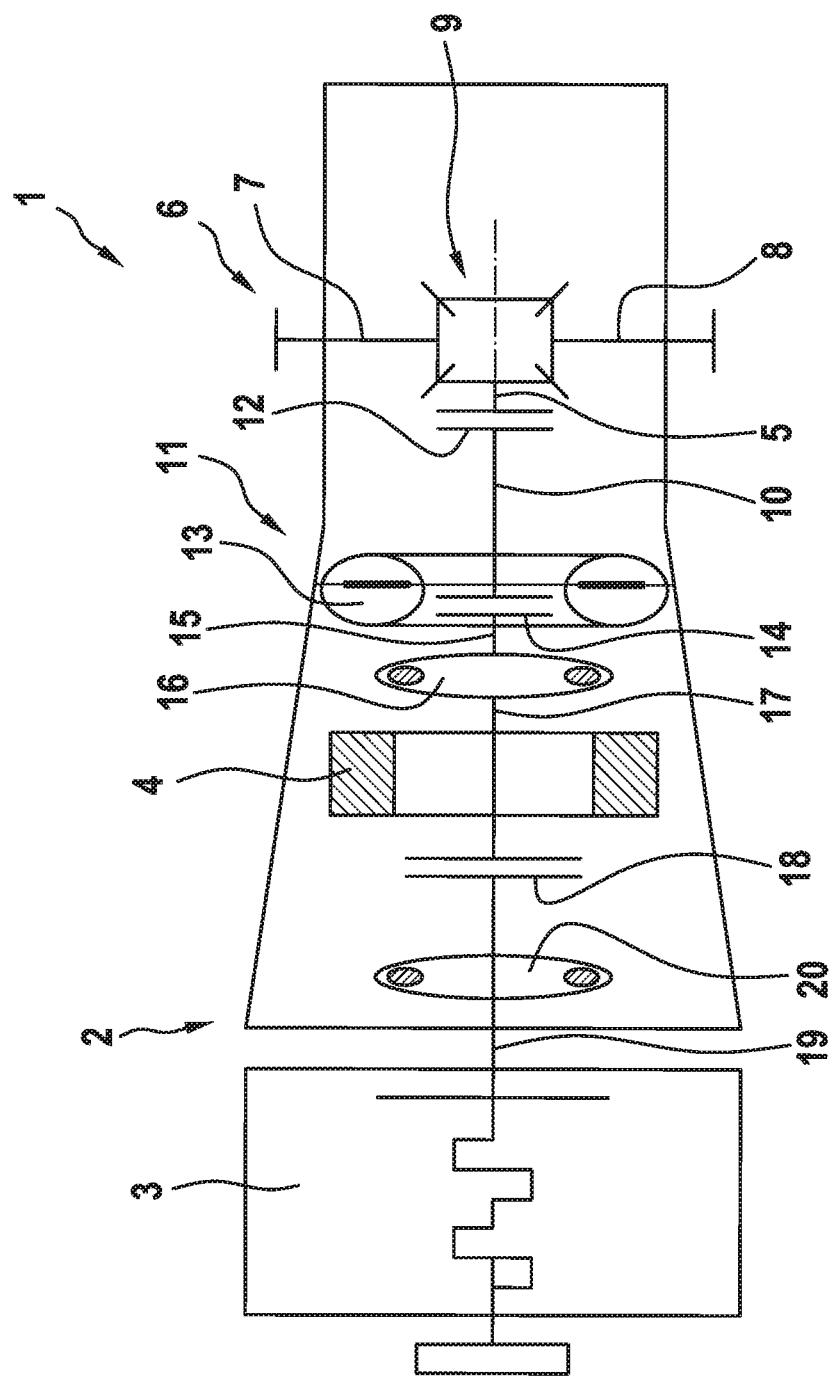

METHOD FOR OPERATING A DRIVE DEVICE FOR A MOTOR VEHICLE AND CORRESPONDING DRIVE DEVICE

FIELD

The invention relates to a method for operating a drive device for a motor vehicle, which has an internal combustion engine or an electric motor, wherein a drive shaft of the internal combustion engine can be coupled to a motor shaft of the electric motor by means of a shift clutch, wherein the shift clutch is adjusted to a desired clutch torque over a dragging period for startup of the internal combustion engine. The invention further relates to a drive device for a motor vehicle.

BACKGROUND

The drive device serves, for example, to drive a motor vehicle and in this respect, therefore, to supply a torque directed at driving the motor vehicle. The drive device is equipped with a plurality of drive assemblies, namely, a first drive assembly designed as an internal combustion engine and a second drive assembly designed as an electric motor. The drive device is accordingly a hybrid drive device. The drive device is equipped, for example, with an output shaft, which can be coupled to the internal combustion engine and to the electric motor.

For example, the internal combustion engine and/or the electric motor can be coupled to the output shaft via a gearshift transmission. For this purpose, the motor shaft of the electric motor is linked, for example, to a transmission input shaft of the gearshift transmission, preferably rigidly and/or permanently. In contrast, a transmission output shaft of the gearshift transmission can be coupled to the driven shaft, preferably rigidly and/or permanently. However, it can also be provided that another clutch, in particular another shift clutch, is provided between the transmission output shaft and the driven shaft.

The electric motor can be coupled to the internal combustion engine via the shift clutch. The internal combustion engine can hereby be decoupled, preferably at the same time, both from the electric motor and from the driven shaft by opening or disengaging the shift clutch. The shift clutch has a plurality of shifting states, wherein, in a first shifting state of the shift clutch, the internal combustion engine or its drive shaft is decoupled from the electric motor or the motor shaft of the electric motor and, in a second shifting state, is coupled to it. In the second shifting state, a slip-free connection between the internal combustion engine and the electric motor or between the drive shaft and the motor shaft is produced, that is, without clutch slippage of the shift clutch.

For startup of the internal combustion engine, it is usually necessary to drag it, in particular, until the internal combustion engine has attained a specific speed. This specific speed can be, for example, a minimum speed or an idling speed of the internal combustion engine. The minimum speed is understood to mean the speed of the internal combustion engine at which it is able to increase its speed further automatically, that is, without the influence of an external torque and, in particular, therefore, in the case of a fully disengaged shift clutch, preferably toward the idling speed. In contrast, the idling speed is a speed to which the internal combustion engine is adjusted when it is not used for driving the motor vehicle or, more generally, for supplying a torque. The idling speed is usually greater than the minimum speed.

The dragging of the internal combustion engine occurs through at least partial closing or engaging of the shift clutch, that is, through the adjustment of a desired clutch torque at the shift clutch. The desired clutch torque is thereby different from zero and, in particular, is greater than zero. An actual clutch torque that is transmitted from the motor shaft to the drive shaft by means of the shift clutch is adjusted to the desired clutch torque, for example in a controlling manner and/or regulating manner. Correspondingly, a torque corresponding to the desired clutch torque is applied to the internal combustion engine, so that its speed increases. The desired clutch torque used for startup of the internal combustion engine is adjusted at the shift clutch over the dragging period. Preferably, the desired clutch torque is kept constant over the dragging period. At the end of the dragging period, the shift clutch is preferably completely disengaged in order to enable an automatic acceleration of the internal combustion engine. In this regard, the dragging period defines the period of time throughout which the speed of the internal combustion engine is increased by means of the torque transmitted via the shift clutch, whereby, at the end of the dragging period, the internal combustion engine preferably has the minimum speed or the idling speed and, in particular, has exactly said speed.

The desired clutch torque is usually chosen in such a way that clutch slippage arises at the shift clutch, that is, such that the speed of the drive shaft is different from the speed of the motor shaft. Depending each time on the design of the shift clutch, a specific quantity of heat hereby accrues. In particular, when the shift clutch is designed as a dry shift clutch, that is, as a shift clutch without direct cooling by a coolant, this quantity of heat is of particular importance, because it can influence the behavior of the shift clutch.

SUMMARY

The object of the invention is to propose a method for operating a drive device for a motor vehicle that has advantages in comparison to known methods and, in particular, avoids a negative influence of the startup of the internal combustion engine on the shift clutch.

This is achieved in accordance with the invention. It is thereby provided that, prior to startup, a quantity of heat expected to accrue in the shift clutch during startup is predicted and, when a limit value is exceeded by the predicted quantity of heat, at least one operating parameter of the drive device that influences the startup is chosen in such a way that the quantity of heat that presumably accrues is reduced.

Prior to the startup of the internal combustion engine, that is, even prior to the adjustment of the shift clutch to the desired clutch torque, the quantity of heat is predicted. This is done on the basis of at least one operating value and/or at least one state value of the drive device and/or a state value of the outer surroundings. The predicted quantity of heat corresponds to the quantity of heat that would be expected to accrue during startup of the internal combustion engine when specific operating parameters are used.

If the predicted quantity of heat exceeds the limit value, then the startup of the internal combustion engine should be influenced, namely through a change in the at least one operating parameter. The at least one operating parameter should be changed correspondingly, starting from an initial value, in such a way that the quantity of heat expected to accrue—that is, the predicted quantity of heat—is reduced. Accordingly, it can also be assumed that the quantity of heat that actually accrues during startup is less than that accruing when the original operating parameter is used.

Another embodiment of the invention provides that the quantity of heat is determined from at least one of the following values: a duration of the dragging period, the desired clutch torque, a difference in speed between a speed of the drive shaft and a speed of the motor shaft, a fuel pressure, a predicted speed gradient of the speed of the drive shaft during startup, and a startup mode of the internal combustion engine. It can be provided that the quantity of heat is determined from only a single one of these values. It is preferred, however, to use a plurality of, that is, at least two of, the values or all of the mentioned values.

The duration of the dragging period is understood to mean the length of the dragging period. The desired clutch torque is the desired clutch torque adjusted at the shift clutch during the dragging period. The difference in the speed between the speed of the drive shaft and the speed of the motor shaft is the difference in speed that exists prior to startup, that is, when the shift clutch is completely disengaged. The fuel pressure is the pressure of the fuel used for operating the internal combustion engine, that is, for example, the pressure in a fuel rail of the internal combustion engine. The higher the fuel pressure, the faster the startup of the internal combustion engine can occur and, therefore, the shorter is the dragging period.

The predicted speed gradient is the gradient of the speed of the drive shaft over time during the startup of the internal combustion engine. It results, for example, from the desired clutch torque and is therefore a function thereof. The startup mode of the internal combustion engine defines, for example, whether the startup of the internal combustion engine occurs in a fueled or unfueled manner. During fueled startup, fuel is injected into the internal combustion engine and is ignited at least partially during the dragging of the internal combustion engine over the course of the dragging period. For unfueled startup, in contrast, the internal combustion engine is initially dragged to a specific speed during the dragging period and only then is fuel injected and ignited.

An enhancement of the invention provides that, for reduction of the quantity of heat that is expected to accrue, one of the following values is adjusted: the duration of the dragging period, the desired clutch torque, the difference in speed between the speed of the drive shaft and the speed of the motor shaft, the fuel pressure, the predicted speed gradient of the speed of the drive shaft during startup, and the startup mode of the internal combustion engine. The value or the values on the basis of which the quantity of heat is determined is or are accordingly also chosen or changed in a targeted manner so as to reduce the quantity of heat.

Another embodiment of the invention provides that, for reduction of the quantity of heat expected to accrue, the duration of the dragging period is shortened by increasing the desired clutch torque. The longer a torque needs to be transmitted via the shift clutch for dragging of the internal combustion engine, the greater is the quantity of heat accruing in or at the shift clutch. Accordingly, the desired clutch torque should be increased, so that the duration of the dragging period is reduced and consequently the quantity of heat also becomes smaller.

A preferred enhancement of the invention provides that, for reduction of the quantity of heat expected to accrue, the difference in speed is reduced by limiting the speed of the motor shaft to a limiting speed. The speed of the drive shaft prior to startup is less than the speed of the motor shaft and, in particular—when the internal combustion engine is at a standstill—is equal to zero. However, if the internal combustion engine is to be started while it is just running down, then its speed can by all means be different from zero. In any case, the speed of the drive shaft or of the internal combustion engine cannot be influenced directly. For this reason, it is necessary for reduction of the difference in speed to influence the speed of the motor shaft or the speed of the electric motor. This is done by limiting upward the speed of the motor shaft to the limiting speed. In this respect the speed of the motor shaft may not exceed the limiting speed.

Another embodiment of the invention provides that the limiting speed is determined on the basis of at least one of the following values: the desired clutch torque, a temperature, a rotational angle position of a crankshaft of the internal combustion engine, the duration of the dragging period, a synchronization state of the internal combustion engine, and the fuel pressure. In this regard, the limiting speed is a function of exactly one of the mentioned values, a plurality of the mentioned values, or all of the mentioned values. The limitation of the speed of the motor shaft to the limiting speed means a limitation of the driving performances of the motor vehicle and should accordingly be kept as small as possible.

Accordingly, the limiting speed is not set to be constant, but rather is determined variably depending on at least one of the values. The desired clutch torque is the clutch torque required for startup of the internal combustion engine, that is, the desired clutch torque expected to be employed during startup. The temperature defines, for example, a temperature of the internal combustion engine and corresponds, in particular, to a lubricant temperature or a coolant temperature or to a temperature of the shift clutch, which influences the desired clutch torque required for startup of the internal combustion engine. The same holds true also for the rotational angle position of the crankshaft of the internal combustion engine.

The duration of the dragging period can also enter into the determination of the limiting speed. This duration depends essentially on the synchronization state of the internal combustion engine and on the fuel pressure. The synchronization of the internal combustion engine is understood to mean an allocation of fuel injection and ignition for at least one cylinder and, in particular, for all cylinders of the internal combustion engine. In this regard, the synchronization state defines whether such a synchronization exists or whether this is not the case.

Another preferred embodiment of the invention provides that, for reduction of the quantity of heat expected to accrue, the speed gradient of the speed of the drive shaft is increased by increasing the desired clutch torque and/or by increasing the duration of the dragging period. Through a further measure for reduction of the quantity of heat during startup of the internal combustion engine, it is possible to increase the speed gradient. This is done, in particular, through an increase in the desired clutch torque and/or through a shortening of the duration of the dragging period, reference to which has already been made above. More preferably, both measures will be carried out, that is, both the desired clutch torque is increased and the duration of the dragging period is shortened.

Another embodiment of the invention provides, that for reduction of the quantity of heat expected to accrue, a specific startup mode is chosen from a plurality of startup modes and employed for startup of the internal combustion engine. The startup modes can be classified or sorted according to the quantity of heat that accrues in the shift clutch when they are implemented. For example, it is provided to exclude from the implementation all startup modes for which the quantity of heat predicted when they are employed exceeds the limit value. In this regard, only startup modes are permitted whose predicted quantities of heat correspond at most to the limit value or are preferably are less than this value.

Finally, in the scope of another embodiment of the invention, it is possible to provide that, as startup modes, an unfueled slip start, an unfueled drag start, a fueled drag start, and/or a fueled drag start are or is employed. Chosen from the mentioned startup modes or at least two of the startup modes is, as described above, the specific startup mode, which is employed for startup of the internal combustion engine. The slip start is understood to mean a start of the internal combustion engine for which the shift clutch is adjusted in such a way that clutch slippage arises in it. The drag start, in contrast, is a start that is carried out without clutch slippage in the shift clutch.

Another enhancement of the invention provides that the desired clutch torque used for startup of the internal combustion engine and to be adjusted at the shift clutch is determined from a temperature and/or—in particular, when the internal combustion engine is at a standstill—a crankshaft position of the internal combustion engine. The desired clutch torque is the torque that is to be transmitted by means of the shift clutch. An actual clutch torque that is in fact transmitted via the shift clutch is preferably adjusted to the desired clutch torque, in particular in a controlling and/or regulating manner.

The desired clutch torque is then determined on the basis of the temperature and/or the crankshaft position of the internal combustion engine. For example, the lower the temperature is, the higher is the desired clutch torque. Taken as temperature is, for example, an internal combustion engine temperature, such as, for example, a lubricant temperature. Additionally or alternatively, the crankshaft position that exists prior to startup, in particular, when the internal combustion engine is at a standstill, is taken.

The crankshaft position defines, for example, an angle of rotation around which the crankshaft of the internal combustion engine has to be rotated until the top dead point in which initially a compression and/or a fuel injection is carried out are or is reached. For a small angle of rotation, less mixture needs to be compressed than for a large angle of rotation, because the first cylinder to be fueled is positioned just before its upper dead point. Accordingly, the smaller the angle of rotation is, the smaller the desired clutch torque is chosen.

Another preferred embodiment of the invention provides that the desired clutch torque is corrected upwards when the speed of the internal combustion engine is greater than zero at the beginning of the startup or when a period of time after the internal combustion engine has been shut off drops below the predetermined period of time, wherein the further the period of time drops below the predetermined period of time, the greater the desired clutch torque is chosen. It was already described above that the startup of the internal combustion engine can occur from any initial speed. If the internal combustion engine was shut off only a short time prior to the startup, then the speed is greater than zero. Accordingly, in the next cylinder in which a compression is to occur, a precompressed mixture is already present.

This makes an increase in the desired clutch torque necessary. For example, the increase in the desired clutch torque occurs within a specific speed range of the internal combustion engine. As lower limit, this speed range has, for example, a speed of greater than zero, in particular infinitesimally greater than zero, at which the internal combustion engine is just barely still in rotation when it runs down. As upper limit, the speed range can have a speed that is less than the minimum speed and/or the idling speed. In particular, the speed is at most 75%, at most 50%, at most 40%, at most 30%, or at most 25% of the minimum speed. If the speed of the internal combustion engine exceeds the speed range, that is, if it lies above it, then it is possible to dispense with an increase in the desired clutch torque, because the still rotating masses of the internal combustion engine assist the startup.

If, when the internal combustion engine runs down, a throttle valve is opened, then the cylinders of the internal combustion engine are still supplied with a full air charge. Accordingly, a precompressed air charge is present in the first cylinder to be compressed. This increased charging is slowly relieved owing to leakage of the cylinder through cylinder seals, for example, after the internal combustion engine has come to a stop. The increased charging in the first cylinder to be compressed shall be taken into consideration in calculating the desired clutch torque. Accordingly, the period of time prior to startup after the internal combustion engine has been shut down is taken into consideration and the desired clutch torque is corrected upwards when the period of time is less than the predetermined period of time. It is hereby provided that, the further the period of time drops below the predetermined period of time, the greater the desired clutch torque is chosen. For example, the desired clutch torque is reduced linearly over the time after the internal combustion engine has been shut down.

Another embodiment of the invention provides that a drive torque that can be supplied by means of the electric motor is limited to a torque limit value, which is determined from a maximum drive torque of the electric motor and a torque reserve. The maximum drive torque corresponds to the maximum torque that can be supplied by means of the electric motor. The maximum drive torque thereby preferably corresponds to a nominal torque at which the electric motor can be operated permanently and continuously.

The torque limit value is determined from the maximum drive torque and the torque reserve. The torque limit value thereby corresponds to the maximum drive torque minus the torque reserve. Through provision of the torque reserve, it is ensured that, at all times, a reliable startup of the internal combustion engine is possible by use of the electric motor. Accordingly, the drive torque that can be produced by the electric motor is limited to the torque limit value.

In the scope of another advantageous embodiment of the invention, it is provided that the torque reserve is determined from a drag torque that is required to start the internal combustion engine. The drag torque corresponds to the torque that is required for dragging the internal combustion engine and, in particular, for dragging it to the minimum speed and/or the idling speed. The torque reserve is then set equal to the drag torque, for example.

Another embodiment of the invention provides that the torque reserve is set equal to the drag torque when an actual torque of the electric motor is less than a maximum drive torque minus the drag torque and it is otherwise set equal to the maximum drive torque minus the actual torque and subsequently increased. As a result, the torque reserve is unnoticeably supplied to the driver of the motor vehicle, namely by initially choosing the torque reserve in such a way that it does not influence the actual torque and it is subsequently slowly increased, so that the actual torque of the electric motor slowly declines.

The invention further relates to a drive device for a motor vehicle, in particular for carrying out the method in accordance with the preceding embodiments, wherein the drive device has an internal combustion engine and an electric motor and a drive shaft of the internal combustion engine can be coupled to a motor shaft of the electric motor by means of a shift clutch, wherein the shift clutch can be adjusted to a desired clutch torque for startup of the internal combustion engine over a dragging period. It is thereby provided that the drive device is designed such that, prior to startup, a quantity of heat that is expected to accrue in the shift clutch during startup is predicted and, when the predicted quantity of heat exceeds a limit value, at least one operating parameter of the drive device that influences the startup is chosen in such a way that the quantity of heat expected to accrue is reduced.

The advantages of such a procedure or of such a design of the drive device have already been addressed. Both the drive device and the method for the operation thereof can be developed further in accordance with the preceding statements, so that reference is accordingly made to the latter.

BRIEF DESCRIPTION OF THE FIGURES

The invention will be discussed below in detail on the basis of the exemplary embodiments illustrated in the drawing, without any limitation of the invention thereby ensuing. The sole FIGURE hereby shows:

FIG. 1 shows a schematic illustration of a drive train for a motor vehicle.

DETAILED DESCRIPTION OF THE FIGURES

The drive train 1 is equipped with a drive device 2, which, in turn, has an internal combustion engine 3, an electric motor, and a driven shaft 5. The drive device 2 serves for driving at least one wheel axle 6 of the motor vehicle, which is composed of two axle members 7 and 8, which are coupled to the driven shaft 5 of the drive device 2 via a differential 9. The driven shaft 5 is coupled to a transmission output shaft 10 of a gearshift transmission 11 of the drive device 2, in particular rigidly and/or permanently and/or by means of an optional shift clutch 12.

The gearshift transmission 11 can have, for example, a torque converter 13, which can be equipped with a converter bridge clutch 14. The gearshift transmission 11 is equipped with a transmission input shaft 15, which is preferably coupled permanently to the torque converter 13. The transmission input shaft 15 can be coupled, in particular rigidly and/or permanently, directly or—as illustrated here—via a damping device 16, such as, for example, a torsional vibration damper, to a motor shaft 17 of the electric motor 4. The electric motor 4 can be arranged coaxially to the transmission input shaft 15 and/or to the transmission output shaft 10.

An operative connection between the internal combustion engine 3 and the electric motor 4 can be adjusted by means of a shift clutch 18. The shift clutch 18 is present here between a drive shaft 19 of the internal combustion engine 3 and the motor shaft 17 of the electric motor 4. In addition, in the operative connection between the internal combustion engine 3 and the shift clutch 18, it is possible to provide optionally another damping device 20. The damping device 20 is preferably constructed as a dual mass flywheel.

In a first shifting state of the shift clutch 18, the internal combustion engine 3 is decoupled from the electric motor 4. In a second switching state, in contrast, it is coupled to the latter. Accordingly, the shift clutch 18 is disengaged in the first shifting state and, in particular, is completely disengaged, and, in the second shifting state, it is at least partially and preferably completely engaged. The complete engaging of the shift clutch 18 can be understood to mean an engaging of the shift clutch 18 with or without clutch overpressure.

The internal combustion engine 3 can be dragged by at least partial closing of the shift clutch 3 and consequently started. The dragging of the internal combustion engine 3 by engaging the shift clutch 3 occurs over the dragging period. During this dragging period, the shift clutch 18 is adjusted to a desired clutch torque. Said torque in this case is preferably chosen in such a way that clutch slippage arises in the shift clutch 18.

Prior to startup of the internal combustion engine by engaging the shift clutch 18, a quantity of heat that is expected to accrue in the shift clutch 18 during the startup is then predicted. If this predicted quantity of heat exceeds a limit value, then at least one operating parameter of the drive device 1 that influences the startup is chosen in such a way that the quantity of heat expected to accrue is reduced. The operating parameter is thereby employed preferably also for determining the quantity of heat expected to accrue.

For example, it is therefore provided that the operating parameter initially has an initial value on the basis of which the quantity of heat is predicted. If the latter exceeds the limit value, then the operating parameter is changed, starting from the initial value, to a value that differs from it, and the prediction of the quantity of heat is carried out once again. This operation is repeated until the quantity of heat corresponds at most to the limit value or is less than it. Subsequently, the startup of the internal combustion engine is carried out using the operating parameter. In this way, it is possible to reduce the quantity of heat accruing in the shift clutch 18 during startup of the internal combustion engine 3.

The invention claimed is:

1. A method for operating a drive device for a motor vehicle, which has an internal combustion engine and an electric motor, comprising:
coupling a drive shaft of the internal combustion engine to a motor shaft of the electric motor by a shift clutch;
adjusting the shift clutch to a desired clutch torque over a dragging period for startup of the internal combustion engine;
predicting a quantity of heat that is expected to accrue in the shift clutch during the startup prior to the startup;
choosing at least one operating parameter of the drive device that influences the startup when the predicted quantity of heat exceeds a limit value to reduce the quantity of heat expected to accrue,
wherein the quantity of heat is determined from at least one of the following values: a duration of the dragging period, the desired clutch torque, a difference in speed between a speed of the drive shaft and a speed of the motor shaft, a fuel pressure, a predicted speed gradient of the speed of the drive shaft during the startup, and a startup mode of the internal combustion engine.

2. The method according to claim 1, wherein for reduction of the quantity of heat expected to accrue, one of the following values is adjusted: the duration of the dragging period, the desired clutch torque, the difference in speed between the speed of the drive shaft and the speed of the motor shaft, the fuel pressure, the predicted speed gradient of the speed of the drive shaft during the startup, and the startup mode of the internal combustion engine.

3. The method according to claim 1, wherein for reduction of the quantity of heat expected to accrue, the duration of the dragging period is shortened by increasing the desired clutch torque.

4. The method according to claim 1, wherein for reduction of the quantity of heat expected to accrue, the difference in speed is decreased by limiting the speed of the motor shaft to a limiting speed.

5. The method according to claim 4, wherein the limiting speed is determined on the basis of at least one of the following values: the desired clutch torque, a temperature, a rotational angle position of a crankshaft of the internal combustion engine, the duration of the dragging period, a synchronization state of the internal combustion engine, and the fuel pressure.

6. The method according to claim 1, wherein for reduction of the quantity of heat expected to accrue, the speed gradient of the speed of the drive shaft is increased by increasing the desired clutch torque and/or by shortening the duration of the dragging period.

7. The method according to claim 1, wherein for reduction of the quantity of heat expected to accrue, a specific startup mode is chosen from a plurality of startup modes and is employed for startup of the internal combustion engine.

8. The method according to claim 1, wherein as startup modes, an unfueled slip start, an unfueled drag start, a fueled slip start, and/or a fueled drag start is or are used.

9. A drive device for a motor vehicle, comprising:
an internal combustion engine and an electric motor, and a drive shaft of the internal combustion engine can be coupled to a motor shaft of the electric motor by a shift clutch, wherein the shift clutch can be adjusted to a desired clutch torque over a dragging period for startup of the internal combustion engine, wherein the drive device is designed such that, prior to the startup, a quantity of heat that is expected to accrue in the starting clutch during the startup is predicted and, when the predicted quantity of heat exceeds a limit value, at least one operating parameter of the drive device that influences the startup is chosen to reduce the quantity of heat expected to accrue,
wherein the quantity of heat is determined from at least one of the following values: a duration of the dragging period, the desired clutch torque, a difference in speed between a speed of the drive shaft and a speed of the motor shaft, a fuel pressure, a predicted speed gradient of the speed of the drive shaft during the startup, and a startup mode of the internal combustion engine.

* * * * *